United States Patent Office.

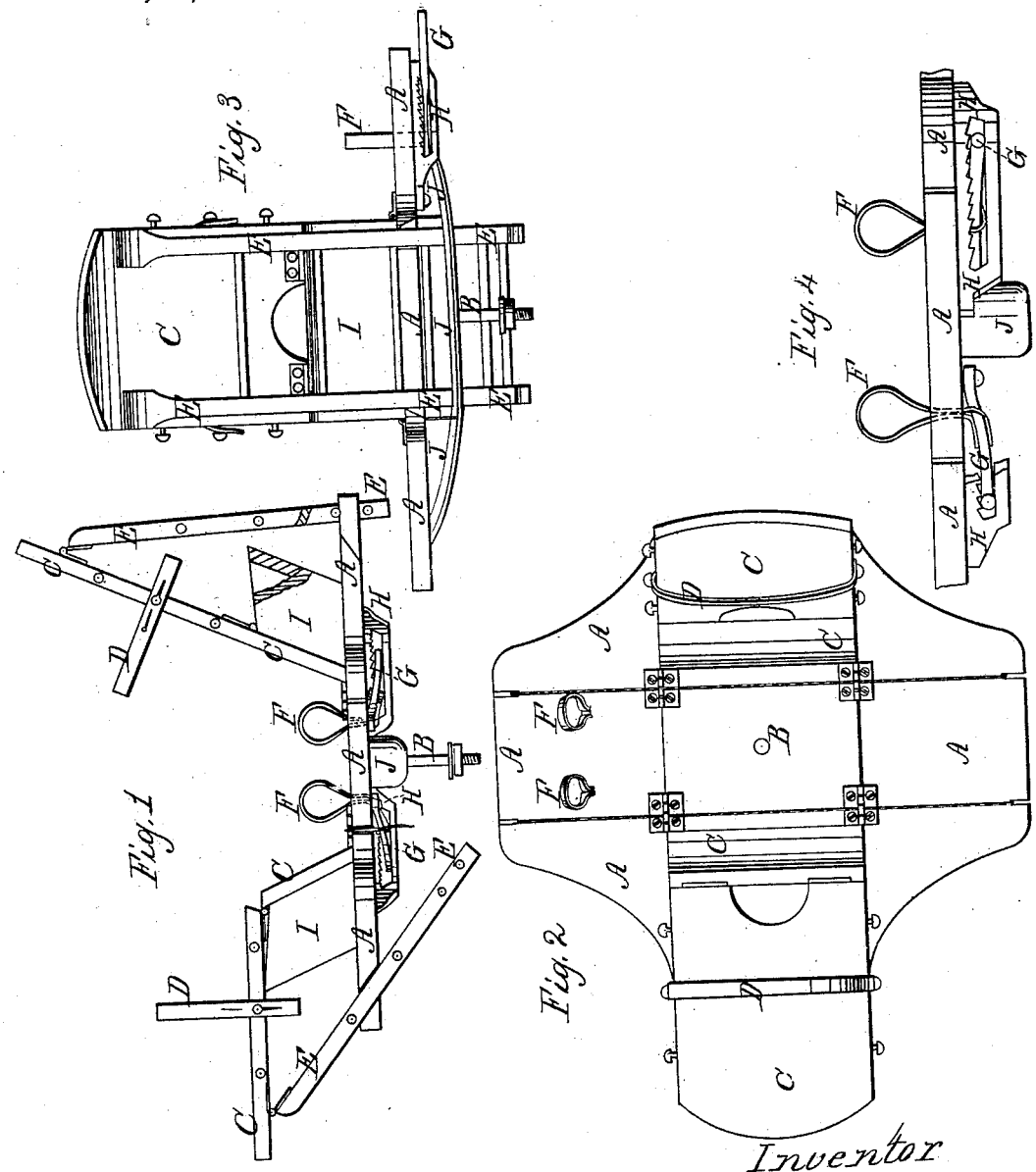

WEBSTER ELLYSON, OF WEST BRANCH, IOWA.

*Letters Patent No. 69,195, dated September 24, 1867.*

SHEEP-SHEARING TABLE.

*The Schedule referred to in these Letters Patent and making part of the same.*

TO ALL WHOM IT MAY CONCERN:

Be it known that I, WEBSTER ELLYSON, of West Branch, in the county of Cedar, and State of Iowa, have invented a new and improved Device for Holding Sheep while being Shorn; and I do hereby declare that the following is a full, clear, and exact description thereof, which will enable others skilled in the art to make and use the same, reference being had to the accompanying drawings, forming part of this specification, in which—

Figure 1 is a rear end view of my improved device, part being broken away to show the construction.
Figure 2 is a top view of the same.
Figure 3 is a side view of the same.
Figure 4 is a detail view of the front end of the platform, part of one catch being broken away to show the construction.

Similar letters of reference indicate like parts.

My invention consists of an improved apparatus for holding sheep while being shorn, formed by the combination of the platform, having hinged ends, hinged adjustable side boards, supporting racks, straps, loops, lever-pawls, catches, and boxes, the whole being so constructed and arranged, as hereinafter more fully described, that the sheep may be securely held, and its position easily and quickly changed as required for shearing each part conveniently.

A is the platform of the apparatus, which is pivoted by the bolt B to a platform or other support of suitable height, which generally is about the height of the operator's knee. C are the side or supporting boards, the lower ends of which are securely attached to the platform A in an inclined position, as shown in fig. 1. The side boards C are jointed or hinged a little above the platform A, as shown in the drawings. D are straps, one or both ends of which are attached to the edges of the side boards C by having holes or slits formed in them, by means of which they are adjustably secured to the knobs attached to the edges of said side boards, as shown in fig. 1. The sides of the platform A in the rear of the side boards C are made in such a form that they will enter between the side bars of the supporting racks E, and their upper sides near their edges are grooved, as shown in fig. 1, to form a secure resting place for the cross-bars of said racks E. The upper ends of the side bars of the racks E are hinged to the upper parts of the side boards C, so that the said side boards may be supported in any desired position. The front and rear ends of the platform A are cut off upon a line with the side edges of the side boards C, as shown in fig. 2, and the said cut-off ends are hinged to the middle part, so that the cut-off ends may be turned up against the side edges of the side boards to form a box for convenience in tying up the fleece. Said ends when turned up may be held up in place by a strap hitched upon a knob attached to the side boards, or in any other convenient manner. Flare straps or loops, which pass down through holes in the forward part of the platform A, and the ends of which are secured to the lever-pawls G, as shown in fig. 4. The inner ends of the lever-pawls G are pivoted to the under side of the front end of the platform A, and their free ends project out into such a position as to be easily reached and operated. H are catches or catch-racks, attached to the under side of the forward part of the platform A in such a position as to take hold of the lever-pawls G and hold them in whatever position they may be placed. The teeth of the racks or catches H are covered with a strap or keeper, $g'$, either formed upon or attached to them, so as to hold the said lever-pawls up in such a position as to readily take hold of the teeth of the racks. I are boxes, formed upon the sides of the platform A for the reception of twine, shears, whetstone, &c. The boxes I are open at their tops, and access may be had to them from the central part of the platform A through openings in the lower ends of the hinged parts of the side boards C, as shown in figs. 2 and 3. The twine with which the fleece is to be tied up is kept in place by being placed in saw-kerfs in the edges of the timbers of the machine. J is a brace-block, attached to the under side of the platform A, and extending nearly from the front to the rear end of said platform. The block J is cut off in a line with the division line between the middle and hinged parts of the platform, so that the ends of said block J may act as braces to sustain the said hinged parts of the said platform, as shown in fig. 3.

In using the apparatus the sheep is placed in a sitting position, and secured to one of the side boards C by passing the strap D around its body, and its hind legs are secured with the straps F. The side of the sheep's neck is then shorn. The strap is then placed around its neck, and the shoulder and upper part of its body shorn. The strap D is then unloosed, and the hinged part of the side board C lowered nearly to a horizontal position, so that the shearer can sit astride upon it, holding the body of the sheep across his left leg, to finish shearing that side. The sheep is then secured to the other side board, the apparatus revolved one-half around, and the other side shorn in the manner already described. The sheep, when shorn, is let go from the front of the platform, leaving the fleece, unmussed and untorn, lying upon the middle and rear part of the said platform.

What I claim as new, and desire to secure by Letters Patent, is—

An improved device for holding sheep while being shorn, formed by the combination of the platform A, having hinged ends, hinged adjustable side boards C, adjustable supporting racks E, straps D and F, lever-pawls G, catches H, and brace-blocks J, with each other, substantially as herein shown and described.

WEBSTER ELLYSON.

Witnesses:
THOMAS COLLINS,
WM. WRIGHT.